Oct. 13, 1925.

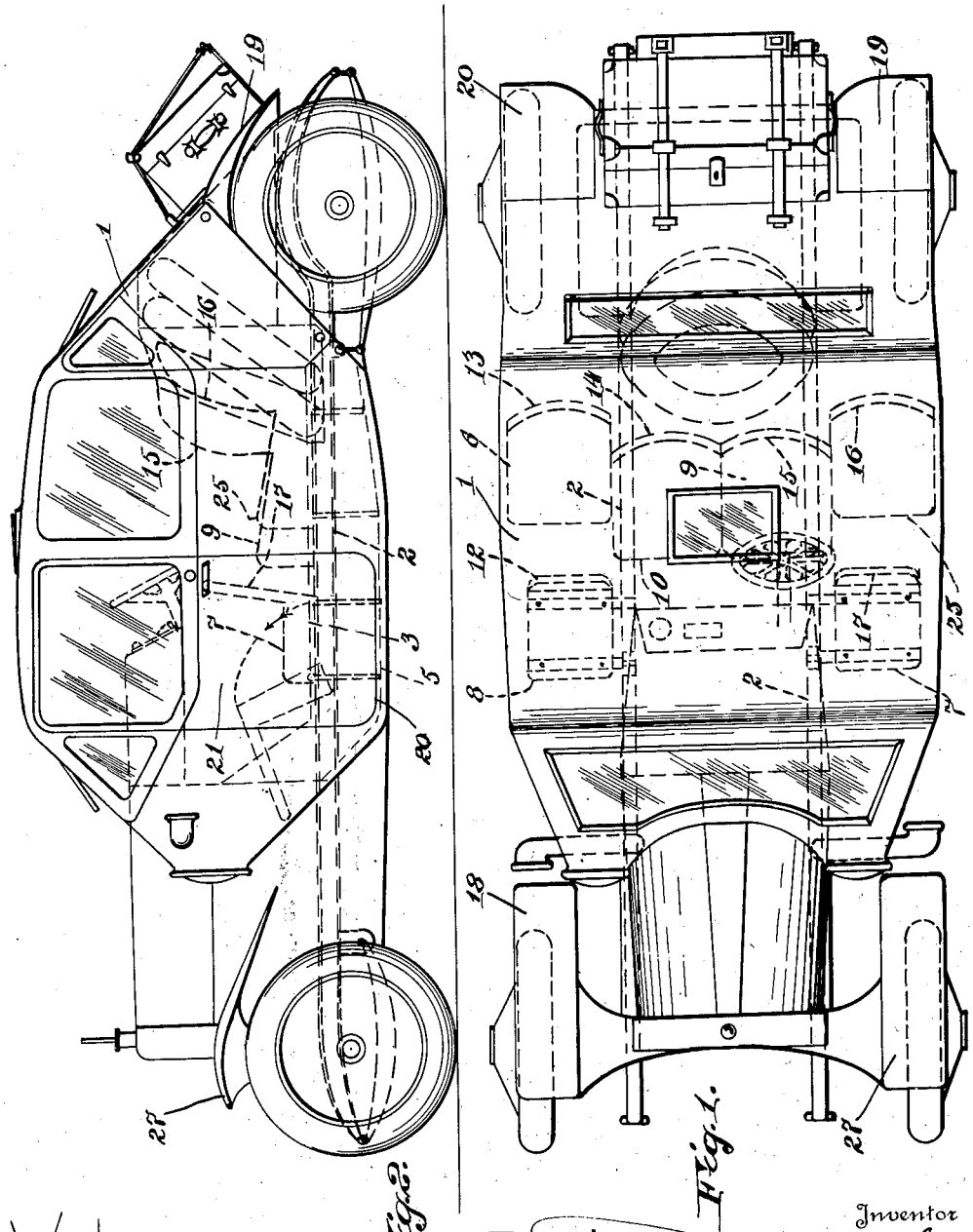

P. FOROSTOVSKY, JR 1,556,778

AUTOMOBILE BODY

Original Filed Jan. 14, 1922    2 Sheets-Sheet 2

Patented Oct. 13, 1925.

1,556,778

UNITED STATES PATENT OFFICE.

PAUL FOROSTOVSKY, JR., OF BALTIMORE, MARYLAND.

AUTOMOBILE BODY.

Application filed January 14, 1922, Serial No. 529,113. Renewed August 11, 1925.

*To all whom it may concern:*

Be it known that I, PAUL FOROSTOVSKY, Jr., a citizen of Russia, residing in Baltimore, State of Maryland, have invented certain new and useful Improvements in Automobile Bodies, of which the following is a specification.

The invention relates to a new and improved type of automobile body.

The popular desire for the low, rakish effect in automobiles has led to the reduction of head room and to greater or less extent to reduction of leg room to the point of considerable discomfort on the part of passengers and drivers, particularly in the sport models.

By my invention I have provided a body of new and unique appearance, low hung and of less dimensions from ground to roof by several inches than the bodies of the most extremely low type now in use, an important achievement of the invention being that this effect is accomplished without sacrifice of leg or head room.

A further advantage is that no variation as to the form and dimension of the chassis is necessary, the body being applied without alteration to any standard chassis of corresponding dimension. The new effect is to a large degree dependent upon an improved manner of suspension or mounting of the body which results in a new and improved structure and arrangement whereby the floor instead of being placed upon the longitudinal frame members is suspended therefrom so that the floor occupies a plane several inches below the frame of the chassis, the latter being enclosed within a raised box or casing which supports the middle seats, of which there are two, the side seats, one at each side of the frame having the seat portion proper or cushions supported at the level of the frame several inches above the floor providing sufficient leg room and an abundance of head room even though the top be lowered several inches below the position which it occupies in the lowest type of bodies made in accordance with the present practice.

The center seats are arranged somewhat after the manner of the present type of sport or racing bodies, the cushions being on the box directly over the frame, the feet being thrust straight forward and ordinarily resting on the box or casing at the height of the frame, but this arrangement of these seats is not objectionable on account of the fact that there are several, four in the present instance, of the ordinary type of seat so that the passengers have the opportunity to elect between four seats having considerable leg room and one in which the passenger takes the couching position. In the roadster or coupé type which is illustrated there are two side seats in front of the four main seats corresponding to the two or three passenger seats of the present common type of roadster or coupé.

In the accompanying drawings I have illustrated an automobile body constructed in accordance with my invention. In the drawings:

Figure 1 is a plan view;

Figure 2 is a side elevation;

Figure 3:
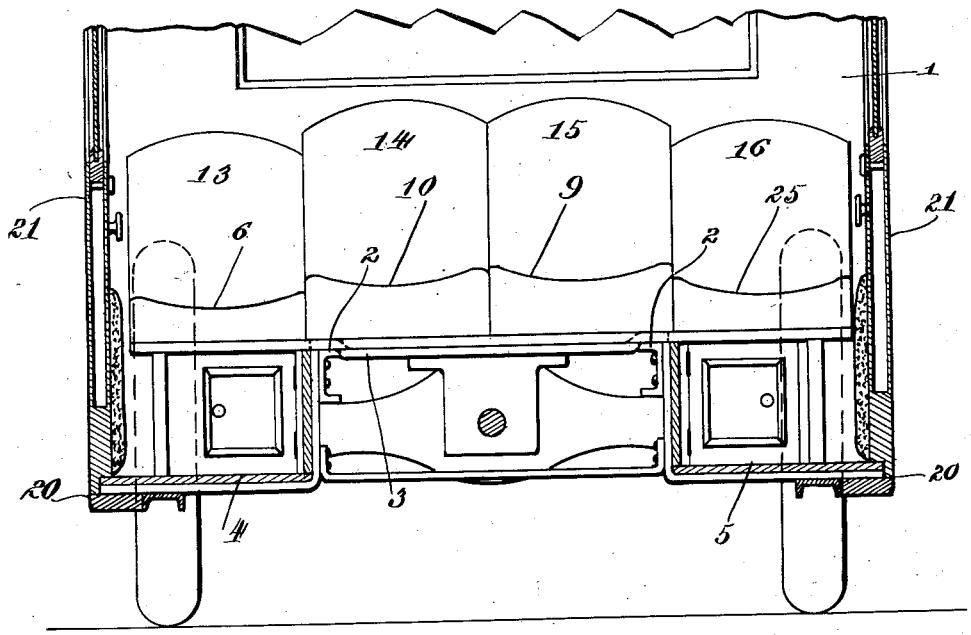
Figure 3 is a vertical transverse section.
Figure 4:
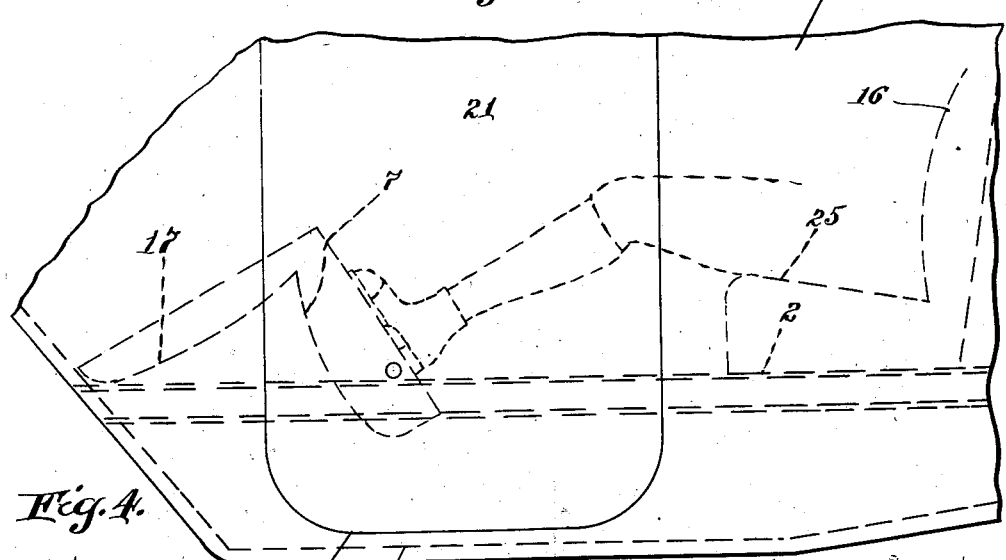
Fig. 4 is a fragmentary side view showing diagrammatically the position of a passenger.

Referring to the drawings by numerals, the illustration includes a body 1 resting on the longitudinal channel bars 2—2 of the chassis, the body having a central box or casing 3 extending longitudinally of the body to receive and engage the channels and provide support for the body. The channel bars 2—2 occupy the upper longitudinal corners of the box. The floor proper 4—5 extends longitudinally at each side of the frame, being dropped several inches below the frame. On this floor there are at each side main seats 25—6 and front folding seats 7—8, all of the seats 25—6—7—8 have 12 to 15 inches leg room in a vertical direction.

Between the main seats 25—6 are two center seats 9—10 consisting of cushions resting directly upon the box or casing 3 and dependent for leg room principally upon the height of the cushions. Each of the seats is provided with a suitable back 12—13—14—15—16—17.

A new and original feature of this body is that the floor members 4—5 occupy substantially the position of the running boards in the ordinary type of body dispensing in fact with the necessity for anything in the nature of a running board. The body being considerably wider than the tread, the sides of the body are protected by the floor from dirt and mud thrown up from beneath. At the front and rear are suitable fenders 27—18—19—20.

The body shown is of the closed or coupé type having a full length door 21 at each side which extends down to the floor which as foresaid is near the level of the running boards in the present type of machine.

The arrangement of the body as described with the floor space in the form of an overhang at the sides of the frame, not only gives the effect of extremely low suspension but also places the center of gravity at a point which as compared with present practice is extremely low and gives two to three feet extra width with corresponding internal space and increased seating capacity. In addition to this the lowering of the floor gives extreme ease of access in entering and leaving the car, the bottom of the door openings 20 which are on a level with the floors 4—5, being only 10 inches to a foot above the road surface. It is therefore obvious that the seats 7—8 being folded out of the way after the manner of the usual folding seats in the present type of seven passenger cars, the side seats 5—6 are most conveniently accessible to passengers entering and leaving the car. Also the arrangement disclosed is extremely convenient for the driver and passenger occupying seats 9 and 10 on the box or frame, as it is merely necessary to swing the foot to the side to rest them on the floors 4—5 in leaving or entering which floors as aforesaid are but an easy step above the road surface. A further advantage is already pointed out in that no alterations of the chassis are necessary, this type of body being adapted to fit any corresponding size of standard chassis.

While my improved type of body and body suspension has been described in connection with a closed roadster or coupé design, it is equally applicable to the touring and sedan or other so called two-seated body designs.

I have thus described specifically and in detail a single embodiment of my invention in order that the nature and operation of the same may be clearly understood, however the specific terms herein are used descriptively rather than in a limiting sense, the scope of the invention being defined in the claims.

What I claim and desire to secure by Letters Patent is:

1. An automobile body and frame construction comprising longitudinal beams of the chassis, floor members at each side of the chassis spaced below and suspended from said longitudinal beams and seats at the side directly over said floor members.

2. An automobile body and frame construction comprising longitudinal beams of the chassis, floor members at each side of the chassis spaced below and suspended from said longitudinal beams and seats at the side directly over said floor members and seats in the center over and between the longitudinal beams.

3. An automobile body and frame construction comprising longitudinal beams of the chassis, floor members at each side of the chassis spaced below and suspended from said longitudinal beams, the floor members extending outward beyond the tread and the body having side walls joined at the bottom to the outer edges of the floor members.

4. The combination of an automobile body and chassis comprising the longitudinal beams of the chassis on which the body is supported, floor members on each side outside of and several inches below said longitudinal beams and extending outward beyond the tread, seats at each side over said floor members and seats in the center over and between the longitudinal beams of the chassis.

5. The combination of an automobile body and chassis comprising the longitudinal beams of the chassis on which the body is supported, floor members on each side outside of and several inches below said longitudinal beams and extending outward beyond the tread, seats at each side over said floor members and seats in the center over and between the longitudinal beams of the chassis, side walls meeting the outer edges of said floor members.

6. The combination of an automobile body and chassis comprising the longitudinal beams of the chassis on which the body is supported, floor members on each side outside of and several inches below said longitudinal beams and extending outward beyond the tread, seats at each side over said floor members and seats in the center over and between the longitudinal beams of the chassis, side walls meeting the outer edges of said floor members and a door in the side walls, the lower edge of the door opening being substantially on a level with said floor members.

Signed by me at Baltimore, Maryland, this 9th day of January, 1922.

PAUL FOROSTOVSKY, Jr.